(Model.)

E. J. F. QUIRIN.
PULP WASHING MACHINE.

No. 284,232. Patented Sept. 4, 1883.

Witnesses:
Rev. J. R. Taylor
William Blake

Inventor:
Emil J. F. Quirin

N. PETERS, Photo-Lithographer, Washington, D. C.

United States Patent Office.

EMIL J. F. QUIRIN, OF TIOGA CENTRE, NEW YORK.

PULP-WASHING MACHINE.

SPECIFICATION forming part of Letters Patent No. 284,232, dated September 4, 1883.

Application filed May 25, 1883. (Model.)

*To all whom it may concern:*

Be it known that I, EMIL J. F. QUIRIN, a citizen of the United States, residing at Tioga Centre, in the county of Tioga and State of New York, have invented certain new and useful Improvements in Pulp-Washing Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to pulp-washing machinery.

Figure 1:
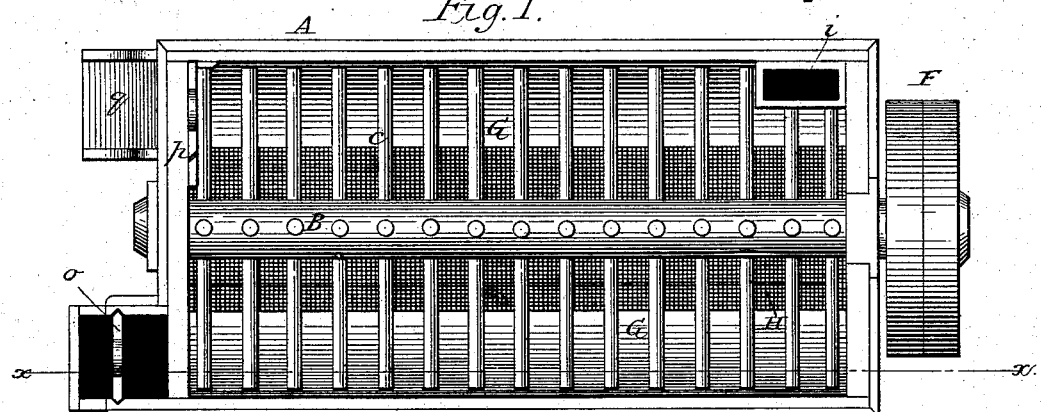
Figure 2:
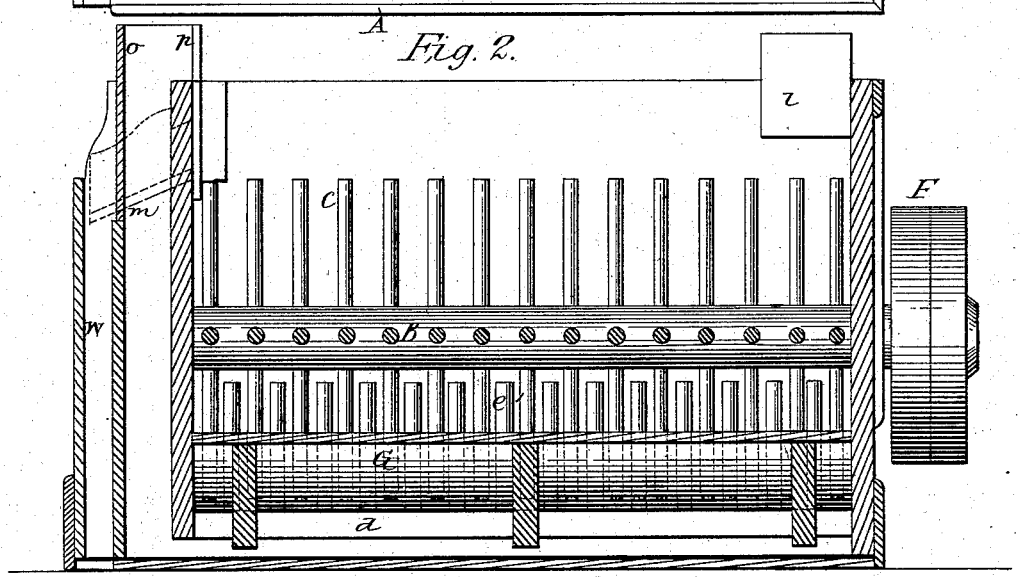
Figure 3:
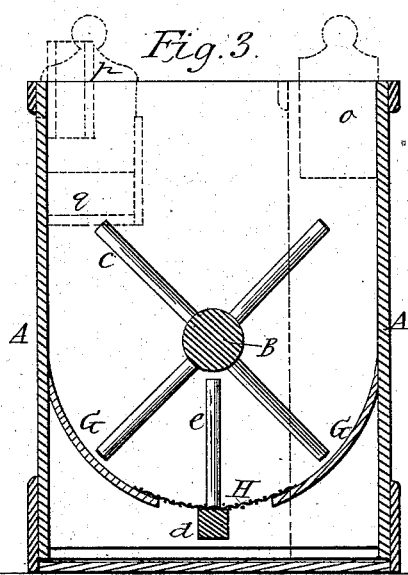

Figure 1 is a top view of machine; Fig. 2, a vertical section; Fig. 3, an end view.

Similar letters refer to similar parts throughout the several views.

A A is the box, made of wood or metal, being put together in any substantial manner to be water-tight, and provided with boxes at either end to support the shaft B, which may be made of wood or metal, provided with prongs C, running through, as shown in the drawings, and projecting on four sides.

D, Fig. 3, is a piece of wood or suitable metal fastened near the bottom of the box, leaving a space for the water to circulate, and provided with vertical-projecting prongs E, standing in such a position that the prongs or beaters C, in revolving, pass between them.

F is the pulley for driving the shaft.

G G represents a circular false bottom containing a netting or screen, H.

I is the inlet for water. $q$ and N are outlets.

The operation of the machine is as follows: The pulp to be washed is thrown into the box. The gate O is open, the gate P being closed. The shaft B revolves, and by the action of the prongs the pulp is thoroughly mixed with the water, which is continually flowing through inlet I, and passing through screen or netting H in false bottom into chamber L L'', and overflows at M into discharge-spout N. When the water at overflow M becomes clear, the gate O is closed and gate P is opened, and the pulp already washed is discharged through spout Q into a receptacle provided for drawing off the water.

I am aware that pulp-washing machines have already been made with revolving prongs. I therefore do not claim such a combination broadly, but—

What I do claim as my invention, and desire to secure by Letters Patent, is—

In a pulp-washing machine, the horizontal chamber L, in connection with the upright chamber L'', with gate O, and elevated overflow M, to discharge the dirt and impurities, with a continuous flow of water, keeping the box full during the operation.

In testimony whereof I affix my signature in presence of two witnesses.

EMIL J. F. QUIRIN.

Witnesses:
J. R. TAYLOR,
WILLIAM BLAKE.